MAGNETIC CORE CIRCUIT

Filed Dec. 30, 1957

INVENTOR
F. T. ANDREWS
BY [signature]
ATTORNEY

United States Patent Office 2,930,903

Patented Mar. 29, 1960

2,930,903

MAGNETIC CORE CIRCUIT

Frederick T. Andrews, Jr., Berkeley Heights, N.J., assignor to Bell Telephone Laboratories, Incorporated, New York, N.Y., a corporation of New York Application December 30, 1957, Serial No. 705,902

10 Claims. (Cl. 307—88)

Figures 1, 2:
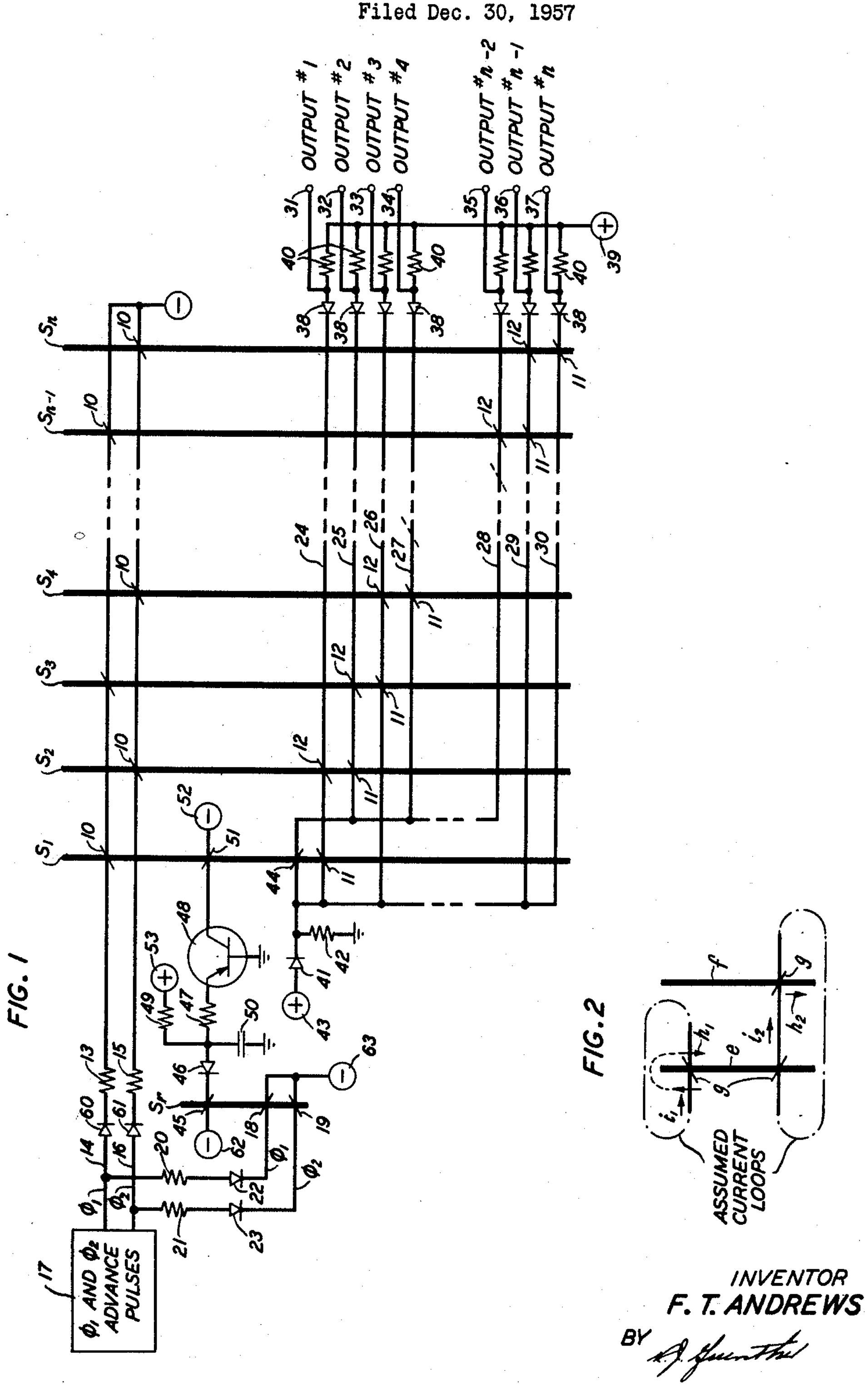

This invention relates to electrical signal generators and, more particularly, to control circuits for automatically resetting magnetic core pulse generating circuits.

In many pulse producing circuits and their applications it is essential that, upon any interruption in the power supply or occurrence of any other condition resulting in the interruption of the generation of output pulses, the pulse generating circuit be restored as quickly as possible to its normal operation. The mere restoration of power or removal of the disabling condition, however, does not in every case effect a resumption of the normal generation of output pulses. This is the case, for example, where the production and proper sequence of output pulses is dependent upon a sequential operation of the pulse generating circuit. In such a circuit each operative step is dependent upon the immediately preceding step and, in order to function properly through a complete cycle of operation, the circuit must at some stage be in a condition whereby such an operative step can be completed. If no stage of the circuit is in such a condition, mere restoration of power or removal of the disabling condition will not necessarily insure the resumption of a normal output.

One pulse producing circuit characterized by sequential operation and requiring a particular condition in one of its stages before normal operation can be commenced is the magnetic core multiphase sequential circuit described by M. Karnaugh in the Proceedings of the Institute of Radio Engineers, volume 43, No. 5, May 1955, pages 570 through 583. In Fig. 17 of that description there is shown a two-phase stepping switch which requires that one core of the switch be in a particular condition of remanent magnetization on its hysteresis loop before the application of alternate advance current pulses can initiate the normal operation of the circuit. Although output loads are not shown in connection with the circuit referred to, such loads can readily be connected to realize a pulse distributing network in which the problem of restoring a normal output after power interruption is encountered. A pulse distributor of this character will be described hereinafter as a convenient circuit for showing an illustrative application of the present invention.

Heretofore, means for accomplishing the restoration of the circuit to its required operable state, i.e., the resetting function, have included manual means. The disadvantages of such means from the viewpoint of reliability and delay are obvious. Other means for resetting the circuit have encountered a secondary problem. When the resetting operation has been accomplished, a normal operation of the circuit may not necessarily have resumed. Thus, the resetting operation may have occurred at the wrong time with respect to the application of the power or advance current pulses, or the resetting operation may have been maintained for too long a time and thereby itself prevented resumption of normal operation. In any event, the resetting operation must be repeated if normal operaiton does not immediately ensue. However, in connection with a repetition of the resetting operation, a sufficient time interval must be allowed between resetting operations to assure that a normal output will not follow. Finally, when a normal output does follow, the resetting operation must not then again be repeated lest the normal sequential operation of the circuit be interrupted.

In circuits of the type described above, it is also frequently desirable to operate the sequential circuit in such a manner that it continues to cycle endlessly, the output stage being effective to initiate operation of the input stage. A function analogous to the resetting function described above must therefore be performed at regular intervals during the normal operation of the sequential circuit. Heretofore, it has been necessary to provide independent means for assuring this resetting function during normal operation of the circuit in addition to means for resetting the circuit after interruption.

It will be noted that interruptions in the normal sequence of operation of such circuits can be occasioned by numerous circumstances in addition to a power failure. A spurious magnetic field, for example, might prevent the normal operation of the circuit. Furthermore, such a condition could exist for only an extremely short period of time and not be recognized by an observer.

It is therefore an object of the present invention to accomplish the resetting of sequential pulse generating circuits after interruption of the normal output and to insure the resumption of that normal output.

It is another object of the invention to automatically reset a sequential pulse generating circuit upon the conclusion of a normal cycle or interruption of the normal output for any reason.

It is a more specific object of the invention to attempt to reset a sequential pulse generating circuit on each step of the sequence and to prevent such an attempt only if normal operation already exists.

In accordance with the present invention, the foregoing objects are achieved by the use of a two-state resetting circuit, the state of which is changed with each step of the sequential pulse generating circuit. The output of the two-state resetting circuit is utilized to attempt to reset the sequential circuit on every other step of the sequential circuit. The resetting operation, however, is inhibited by proper operation of the sequential circuit during all of the corresponding steps except the last such step, in which case the resetting operation is permitted to occur.

In the specific illustrative application of the present invention to be described, the sequential circuit comprises a plurality of magnetic core stages divided into two groups. One condition of remanent magnetization is then "shuttled" between these two groups by means of advance pulses applied alternately to the groups to advance this condition of magnetization from core to core throughout the entire plurality. In such an embodiment it is advantageous to utilize another magnetic core as the two-state resetting circuit. In this case, the condition of remanent magnetization of the resetting core can be switched on each advance pulse. The output of the resetting core is then utilized to attempt to reset the first stage of the magnetic core sequential circuit during each even numbered advance pulse. An inhibiting winding on this first stage, however, can be connected in series with each of the output circuits of all of the even cores except the last and can be wound in the proper sense to prevent resetting so long as a pulse exists in any of the output conductors.

One advantage of the present invention is that the resetting function, when required, will be repeated indefinitely in the proper time slot until normal operation is actually resumed. Another advantage of the invention is that the resetting circuit thus provided will recognize and act upon the interruption of normal operation within a period of one cycle of operation, thus insuring substantially continuous operation of the sequential circuit even in case of spurious interferences of a transient nature.

These and other objects and features, the nature of the present invention and its various advantages, will appear more fully upon consideration of the accompanying drawing and the following detailed description of the drawing.

In the drawing:

Fig. 1 is a schematic diagram of a sequential pulse generating circuit utilizing magnetic cores and embodying the principles of the present invention; and Fig. 2 depicts the mirror symbol notation employed in the diagram of Fig. 1 to represent the circuit elements of this embodiment of the invention.

Referring first to Fig. 2, it can be seen that, in the mirror symbol notation, the magnetic cores are represented by double vertical lines *e* and *f* and the current conductors by single horizontal lines. When not specifically so, the horizontal current conductors are assumed to close in themselves in loops, as shown, to form a complete circuit. The core windings are then represented by the short lines *g* intersecting the horizontal conductors and the cores at an angle of 45 degrees. The representations *g* are termed "mirror" symbols and the direction of the angle corresponds to the sense of the winding with reference to the direction of current flow. When a current, such as $i_1$, flows in a conductor, the direction of the magnetic flux arising from the current in the winding is readily determined by "reflecting" the current in the winding "mirror" *g*. By projecting the flux lines so produced around the end of the core symbol *e*, as indicated by $h_1$, the direction of the current $i_2$ in the conductor connected to the other winding *g* of the core *e* can be determined by "reflecting" the flux $h_1$ in the winding "mirror" *g*. The direction of the flux $h_2$ in the core *f* produced by the current $i_2$ is similarly determined by "reflecting" the current $i_2$ in the "mirror" *g* as indicated.

With this mirror symbol notation in mind, we will now proceed to a description of a sequential pulse generating circuit in accordance with the invention. Thus, in Fig. 1 there is shown one illustration of a self-starting magnetic core stepping switch comprising a succession of magnetic storage cores $S_1$, $S_2$, et cetera, through $S_n$. These magnetic cores are advantageously of the well-known ferrite or magnetic-tape type exhibiting a substantially rectangular hysteresis characteristic and are capable of remaining in either of two conditions of remanent magnetization to which they are switched by an applied magnetomotive force.

Each of the switching cores $S_1$ through $S_n$ is provided with an advance winding 10, an output winding 11, and all but the first core are provided with an input winding 12. The advance windings 10 of the odd-numbered cores are connected in series with a current limiting resistor 13 and a diode 60 by means of a conductor 14 and the advance windings 10 of the even-numbered cores are similarly connected in series with a current limiting resistor 15 and a diode 61 by conductor 16. A two-phase positive-going advance pulse source 17 is provided to alternately apply advance pulses, which may be designated $\varphi_1$ and $\varphi_2$ pulses, to conductors 14 and 16, respectively. These advance pulses are used as a source of power to drive the stepping switch in a manner to be described.

A resetting core $S_r$ is provided with two input windings 18 and 19 which are connected to conductors 14 and 16, respectively, through resistors 20 and 21 and diodes 22 and 23. Diodes 22, 23, 60 and 61 prevent the circulation of spurious currents generated in each advance conductor when the other advance conductor is being pulsed. Input windings 18 and 19 in core $S_r$ are arranged to switch the condition of remanent magnetization of resetting core $S_r$ on each advance pulse. That is, resetting core $S_r$ is "set," i.e., magnetized in an upward direction, on each $\varphi_2$ advance pulse on conductor 16, and is "reset," i.e., magnetized in a downward direction, on each $\varphi_1$ advance pulse on conductor 14. The state of magnetization of resetting core $S_r$ will therefore shift with each advance pulse produced by source 17. Each of the advance pulse conductors 14 and 16 is connected, after the last advance winding 10 of core $S_n$, to a negative voltage supply 63 to complete the circuit for the advance pulse current.

Each of a series of output conductors 24 through 30 connects the output winding 11 of one core with the input winding 12 of the next succeeding core. Each of these output conductors 24 through 30 is also connected to one of the output terminals 31 through 37 by way of diodes 38. Load resistors 40 are biased from a common positive voltage source 39.

The other end of output conductors 24, 26, 29 and 30, comprising the output conductors of all of the odd-numbered cores and the last core, are connected directly to a current limiter comprising diode 41 and resistor 42 and supplied from a positive voltage source 43. The other end of the output conductors of all of the even-numbered cores except the last are connected to this current limiter through an inhibiting winding 44 on core $S_1$. The function of this arrangement will be described hereinafter.

The interconnections between the cores $S_1$ through $S_n$ are substantially in accordance with the switching principles described by M. Karnaugh in the previously cited reference. Upon application of a $\varphi_1$ advance current pulse to the advance conductor 14, all of the odd-numbered cores will be switched to the set condition (magnetized upward) unless already in that condition. Assuming for the moment that all of the cores except core $S_1$ are already in the set condition, a switching flux will be developed only in core $S_1$. In accordance with the mirror symbol notation hereinbefore described, the current induced in output winding 11 of core $S_1$ is seen to flow in conductor 24 from right to left and to produce a flux in core $S_2$, by way of input winding 12, to reset core $S_2$. Furthermore, since conductor 24 is connected to load resistor 40, this induced current pulse flows through resistor 40 and produces a voltage change at output terminal 31.

When core $S_2$ is switched from its now reset condition to a set condition by the following $\varphi_2$ advance pulse on conductor 16, the reset condition will be shifted to core $S_3$ and an output pulse produced on output terminal 32. It can be seen that the advance pulses serve to shift a specific state of remanent magnetization, in this case the reset or downwards magnetization condition, between the storage cores in a direction from left to right. Furthermore, with each step of this shifting operation, an output pulse is produced on one of the output conductors and is transferred to a corresponding output circuit. The output circuits are thus sequentially energized beginning with output circuit number one and proceeding through output circuit number *n*. It is this latter sequence of output pulses in this specific embodiment which it is the object of this invention to maintain.

The current limiter comprising diode 41 and resistor 42 is designed to limit the current which can be supplied to the output conductors to an amount only sufficient to support a single flux transfer between the cores. Thus, in the absence of any flux transfers, a fixed amount of current is drawn from positive voltage source 43 through diode 41 and resistor 42 to ground. Current is blocked in the output conductors by diodes 38. When a flux transfer occurs, current flows from positive voltage source 39, through the appropriate diode 38, through the appropriate windings and through the current limiter. This current flows in the direction opposite to the current flow from source 43 and hence tends to back-bias diode 41. The values may be chosen such that diode 41 will go into a high resistance condition if the current in the output conductors exceeds a specified value, i.e., the value required for a single flux transfer. In this way, one and only one flux transfer can take place at a time and the pulse generating circuit is constrained to maintain a single pulse output. By proper biasing from voltage source 39, diodes 38 prevent back transfer between the cores. Furthermore, when any of the switching cores are being reset, diodes 38 prevent excessive loading of the reset core and consequent slowing of the switching action by blocking current flow in the output conductor of the reset core.

In accordance with the present invention, resetting core $S_r$ has an output winding 45 connected in series with a negative voltage source 62, a diode 46, a resistor 47 and the emitter-to-base path of a junction transistor 48. A positive voltage is supplied from voltage source 53 to the anode of diode 46 through a resistor 49 and this anode of diode 46 is tied to ground through a capacitor 50. The collector of transistor 48 is connected to a resetting winding 51 on storage core $S_1$ while the base of transistor 48 is grounded. The resetting circuit is completed through negative voltage supply 52 which biases the collector of transistor 48. The automatic resetting circuit operates as follows.

The relative bias voltages from voltage source 62 and at the base of transistor 48 are chosen such that all of the current drawn from source 53 normally flows through diode 46 and output winding 45, holding transistor 48 cut off. Each $\varphi_1$ advance pulse from advance pulse source 17 sets core $S_r$ and induces a current in winding 45 flowing from right to left and adding to the current already present, thus not affecting the normal condition of diode 46. On each $\varphi_2$ advance pulse, however, core $S_r$ is reset and a voltage is induced in winding 45 from left to right. This voltage is sufficient to reverse-bias diode 46 and cut it off. Capacitor 50 is then charged from source 53 until the emitter of transistor 48 becomes sufficiently positive to begin conducting. A similar current then flows through the collector of the transistor 48 and resetting winding 51 of core $S_1$, attempting to reset core $S_1$.

As noted above, the output conductors of all of the even-numbered cores except the last are connected to an inhibiting winding 44 on core $S_1$. Thus, when a pulse exists on any one of these output conductors, a magnetomotive force is developed in core $S_1$ attempting to set that core. Since pulses appear on these output conductors only during even advance pulses, the forces developed in core $S_1$ by windings 44 and 51 occur simultaneously and are in opposition. These forces therefore normally cancel each other and no change takes place in the condition of remanent magnetization of core $S_1$. When the reset condition reaches core $S_{11}$, or the normal pulse output is otherwise interrupted, inhibit winding 44 on core $S_1$ is not energized and hence core $S_1$ is reset to initiate a new cycle of operation.

It will be noted that core $S_1$ will be reset on every even-numbered advance pulse from source 17 for which a normal pulse output does not occur. Furthermore, this resetting is inherently synchronized with the advance pulses. It can therefore be seen that the sequential pulse circuit of Fig. 1 will be reset on the next even-numbered advance pulse following interruption of the normal pulse output. Furthermore, the circuit will continue to be reset on even-numbered advance pulses until normal operation is resumed.

When the reset condition reaches core $S_n$, the last core in the sequential circuit, the following even advance pulse will shift the reset condition out of core $S_n$. Since no inhibiting action takes place at this time, core $S_1$ will be reset to initiate the next cycle of operation. In this way, normal operation, as well as resumption of operation after undesired interruptions, is secured with the same circuit elements.

The driving circuit for the resetting core $S_r$ is preferably chosen such that the duration of the output pulses from the even cores is substantially longer than the time required to switch $S_r$. In this way, the resetting pulses can be "bracketed" by the inhibiting pulses, i.e., begin after the initiation of the inhibiting pulse and terminate prior to the decay of the inhibiting pulse. Effective inhibiting action can thus be obtained without the danger of partially resetting core $S_1$. Capacitor 50 serves to delay the conduction of transistor 48 for the necessary interval.

The particular coupling circuit between output winding 45 of resetting core $S_r$ and resetting winding 51 of storage core $S_1$ has been chosen to reduce the drain on advance pulse source 17. Any other coupling circuit, however, will be equally suitable, provided unidirectional operation is secured. A simple diode may, for example, be substituted for this coupling circuit to provide the necessary operation. Moreover, other combinations of transistor and magnetic cores or transistors alone may be used to provide the resetting pulses at the proper times.

It is to be understood that, while the invention has been described with respect to magnetic core circuits, this description is merely illustrative of numerous and varied other arrangements which could represent applications of the principles of the invention. Such other arrangements may readily be devised by those skilled in the art without departing from either the spirit or the scope of the invention.

What is claimed is:

1. A self-starting magnetic pulse commutating circuit comprising a plurality of magnetic switching cores arranged in succession, stepping means for shifting a given condition of magnetization between said switching cores in regular succession, a magnetic recycling core, means for changing the condition of magnetization of said recycling core in response to each shift of said stepping means, means for setting a first one of said switching cores in said given condition of magnetization in response to a change in said recycling core to said given condition of magnetization, means for inhibiting said setting means in response to a change in the condition of magnetization of any of selected ones of said switching cores, and load means coupled to each of said switching cores and arranged to be energized by a change in the condition of magnetization to said given condition of the coupled one of said switching cores.

2. In a stepping switch of the type including a plurality of switching devices and means for switching said devices in sequence to produce commutated output pulses, a self-starting circuit comprising bistable circuit means having two discrete conditions of stability, means for alternating the condition of stability of said bistable circuit means, said alternating means being responsive to each operation of said switching means, means for resetting said stepping switch in response to one condition of stability of said bistable circuit means, and means for inhibiting said resetting means in response to the switching of at least some of said devices.

3. The combination according to claim 2 in which said switching devices comprise magnetic cores having two conditions of remanent magnetization.

4. The combination according to claim 2 in which said bistable circuit means comprises a magnetic core having two conditions of remanent magnetization.

5. An electrical circuit comprising a plurality of two-state devices connected in cascade such that the output of each device is coupled to the input of the next succeeding device, means for transferring one of said two states between coupled ones of said devices, a plurality of load means, each of said load means being connected to be energized by the output of one of said devices, and automatic starting means, said starting means comprising a bistable circuit means responsive to said transferring means for altering its condition of stability, means responsive to said bistable circuit means for inducing said one state in one of said two-state devices, and means for inhibiting said inducing means, said inhibiting means being energized by the transfer of said one state from alternate ones of said devices.

6. An electrical circuit comprising a plurality of magnetic cores arranged in two groups, each of said cores including an activating winding, an input winding and an output winding, a two-phase activating pulse source producing pulses alternately on said two phases, means connecting the activating windings of the first group of cores in series with one phase of said activating pulse source, means connecting the activating windings of the second group of cores in series with the other phase of said activating pulse source, means connecting each output winding of each group of cores except one output winding on one core of said first group to an input winding of the other group of cores and to a utilization circuit, a resetting core, said resetting core including first and second input windings and an output winding, means connecting said first input winding to said one phase of said activating pulse source, means connecting said second input winding to said other phase of said activating pulse source, one of said cores of said second group including a resetting winding and an inhibiting winding, unidirectional conducting means connecting said output winding of said resetting core and said resetting winding, and means connecting said output windings of all of said cores of said first group except said one output winding to said inhibiting winding whereby a reversal of magnetization in any of said cores of said first group except said one inhibits the action of said resetting winding on said one core of said second group.

7. The combination according to claim 6 wherein said unidirectional conducting means includes the emitter and collector of a transistor.

8. The combination according to claim 6 wherein said resetting core includes means for reversing its direction of magnetization in an interval substantially shorter than the interval required to reverse the direction of magnetization of said plurality of magnetic cores, and wherein said unidirectional conducting means includes delaying means.

9. An electrical circuit comprising a plurality of magnetic cores, each of said cores having an input winding, an output winding and an activating winding coupled thereto, means for connecting alternate ones of said activating windings in series, a pluraltiy of load means, means connecting each of said load means in series with the output winding on one of said cores and the input winding on another one of said cores, means for applying activating pulses to said activating windings whereby a given condition of magnetization is transferred between said cores to sequentially energize said load means, bistable circuit means having two stable conditions of operation, means for setting and resetting said bistable circuit means between said two stable conditions of operation in response to said activating pulses, output means responsive to one of said two stable conditions of operation of said bistable circuit means for producing a resetting pulse, means for inducing said given condition of magnetization in one of said cores in response to said resetting pulse, and means for inhibiting said inducing means in response to the transfer of said given condition of magnetization from alternate ones of said cores.

10. The combination according to claim 9 in which said bistable circuit means comprises a magnetic core, said inducing means comprises a resetting winding on said one core and said inhibiting means comprises an inhibiting winding on said one core.

References Cited in the file of this patent

UNITED STATES PATENTS

| | | |
|---|---|---|
| 2,406,834 | Hartley et al. | Sept. 3, 1946 |
| 2,446,943 | McGoffin | Aug. 10, 1948 |